United States Patent
Macht et al.

(10) Patent No.: US 7,844,312 B2
(45) Date of Patent: Nov. 30, 2010

(54) SYSTEM FOR ACCESSING INFORMATION AND FOR COMMUNICATION IN A VEHICLE HAVING A PLURALITY OF COUPLED UNITS

(75) Inventors: Alois Macht, Gross-Umstadt (DE); Norbert Grund, Mainz (DE); Wolfgang Kreher, Muenster (DE); Jose Luis Mateo Terres, Darmstadt (DE); Klaus Stoettinger, Wiesbaden (DE); Gerd Zimmermann, Weiterstadt (DE)

(73) Assignee: Deutsche Telekom AG, Bonn (DE)

( * ) Notice: Subject to any disclaimer, the term of this patent is extended or adjusted under 35 U.S.C. 154(b) by 650 days.

(21) Appl. No.: 11/804,372

(22) Filed: May 18, 2007

(65) Prior Publication Data
US 2008/0032711 A1 Feb. 7, 2008

(30) Foreign Application Priority Data
May 18, 2006 (DE) .................. 10 2006 023 319

(51) Int. Cl.
 *H04B 1/38* (2006.01)
(52) U.S. Cl. ............... 455/575.9; 455/41.2; 455/569.2; 455/98; 455/99; 370/328; 370/338
(58) Field of Classification Search ............... 455/41.2, 455/569.2, 575.9, 98, 99, 431, 432.2, 432.3, 455/440; 370/328, 338
See application file for complete search history.

(56) References Cited

U.S. PATENT DOCUMENTS

| 7,167,723 | B2 * | 1/2007 | Zhang | .............. 455/554.2 |
| 2005/0254818 | A1 * | 11/2005 | Zhou et al. | .............. 398/43 |
| 2006/0165103 | A1 * | 7/2006 | Trudeau et al. | .............. 370/401 |
| 2006/0271970 | A1 * | 11/2006 | Mitchell et al. | .............. 725/82 |

* cited by examiner

*Primary Examiner*—Tuan A Pham
(74) *Attorney, Agent, or Firm*—Kenyon & Kenyon LLP

(57) ABSTRACT

A system and method for accessing information and for communication in a high-speed vehicle having a plurality of coupled units, including at least one server unit that is provided in one unit of the vehicle and is set up for making information available and for communication, a plurality of radio access points which are provided in different units and are designed for data communication with data-processing devices via radio, a data network which connects the server unit to the radio access points in terms of communication, and which has wireless communications links between adjacent coupled units.

16 Claims, 2 Drawing Sheets

SYSTEM FOR ACCESSING INFORMATION AND FOR COMMUNICATION IN A VEHICLE HAVING A PLURALITY OF COUPLED UNITS

CROSS-REFERENCE TO RELATED APPLICATIONS

The present application claims priority to Application No. DE 102006023319.0, filed in the Federal Republic of Germany on May 18, 2006, which is expressly incorporated herein in its entirety by reference thereto.

FIELD OF INVENTION

The present invention relates to a system for accessing information and for communication in a vehicle, e.g., a high-speed vehicle, having a plurality of coupled units.

BACKGROUND

The German Patent Publication DE 102 07 858 A1 appears to concern a method and system for providing information and for communication in vehicles such as trains, for example, in which vehicle occupants, using electronic devices such as laptops or PDAs (personal digital assistants), are able to access information such as schedule data, messages or entertainment offerings stored locally in the vehicle. The access apparently takes place via radio communication between the electronic devices and radio access points, which are distributed in the vehicle. In order to permit a high data-transmission rate, and therefore efficient access to the locally stored information, radio technologies such as WLAN (Wireless Local Area Network), radio technologies IEEE 802.11, Bluetooth or HYPERLAN/2 are used.

A system of this type is being used in some ICE (Intercity Express) trains of Deutsche Bahn AG in cooperation with T-Mobile Deutschland GmbH, and allows passengers of Deutsche Bahn AG to access various information, e.g., from their laptop or PDA with WLAN radio interface.

SUMMARY

Embodiments of the present invention provide a system for accessing information and for communication in a vehicle having a plurality of coupled units, that, for example, makes a reliable and redundant service available to users.

Embodiments of the present invention provide a system for accessing information and for communication in a vehicle having a plurality of coupled units.

Embodiments of the present invention provide that in a vehicle, especially a high-speed vehicle, having a plurality of coupled units like, for instance, a high-speed train having several cars, as a rule there is no possibility to use cable connections between the individual adjacent units for the data transmission, since in practice, a cabled data transmission is problematic in several regards, in particular is subject to high mechanical stresses. Therefore, embodiments of the present invention provide a wireless communications link between adjacent units, e.g., a radio-based communications link. Using such a communications link between the coupled units, one may attain a high data-transmission rate and, above all, a relatively interference-free data transmission. In addition, a data network can be formed through the entire vehicle, which means outfitting costs can be lowered compared to the outfitting of each individual unit of the vehicle with servers for communication and for providing information.

Embodiments of the present invention provide a system for accessing information and for communication in a vehicle having a plurality of coupled units, the system including: at least one server unit, provided in one unit of the vehicle, which is set up for providing information and for communication; a plurality of radio access points, provided in various units, which are designed for data communication with data-processing devices via radio; and a data network which connects the server unit to the radio access points communications-wise, and which has wireless communications links between adjacent coupled units.

By forming a data network in the entire vehicle, a wireless access via radio to information, e.g., a wireless Internet access, and a wireless communication via radio, e.g., the sending and receiving of e-mails via the Internet, is made possible for passengers equipped with data-processing devices. Because adjacent units of the vehicle are coupled communications-wise, it is not necessary to provide a stand-alone server unit for providing information and for communication in each unit, but rather one central server unit suffices for the entire vehicle. The costs for outfitting a vehicle having a plurality of coupled units may thus be reduced considerably.

In embodiments of the present invention, a wireless communications link between two adjacent coupled units of the vehicle may be implemented by a radio bridge. A radio bridge may be implemented using cost-effective WLAN components. In this way, it is possible to create an inexpensive and, in comparison to a cable connection, relatively reliable communications link between the individual units.

In an embodiment of the present invention, the radio bridge for radio communication may be implemented in a frequency range which differs from the frequency range used for a radio communication within the units, in such a way that interferences possibly occurring are minimized.

In an embodiment of the present invention, the server unit includes an access and gateway server that is set up for controlling the entire communication via the data network and for radio communication with the Internet.

In a further embodiment of the present invention, the access and gateway server may be set up in such a way that a radio communication with the Internet takes place with the aid of a mobile radio communications technology and/or wireless LAN (Local Area Network)/MAN (Metropolitan Area Network) technology. UMTS (Universal Mobile Telecommunication System), for example, presents itself as mobile radio communication technology, which in the meantime permits a data-transmission rate comparable to DSL (Digital Subscriber Line). With UMTS, therefore, even given a multitude of parallel communications links, a data-transmission rate sufficient for Internet access and e-mail communication can be made available to each link.

In embodiments of the present invention, to avoid problems with, for example, radio-controlled train signals or the like, e.g., in certain geographical regions, according to one specific embodiment of the present invention, the system may be set up in such a way that the radio access points and the wireless communications links between adjacent coupled units are activated or deactivated as a function of the geographical position of the vehicle. For example, in the case of a train, the system may be switched off automatically upon crossing a national border, in order to avoid interferences of train signals, etc., due to the radio communication.

Moreover, according to an embodiment of the present invention, the system may be set up in such a way that the radio access points and the wireless communications links between adjacent coupled units are deactivated when the vehicle leaves a predetermined region, and are activated again when the vehicle enters the predetermined region. For example, the activation and deactivation may be controlled by a navigation system such as GPS or the future European satellite navigation system Galileo.

In an embodiment of the present invention, in order to make an information offering available to passengers even when a communications link to the world outside the vehicle is broken, the server unit may also include an application server, which is provided for local information and application provisioning in the vehicle. For example, the switchover to the local information and application offering or the application server may take place automatically when an interruption of the communications link to the outside world is detected by the server unit.

In an embodiment of the present invention, in order to optimally utilize the capacity of the data network, the data network may be a Local Area Network—LAN—in which at least three virtual LANs—VLANs—are implemented, of which a first VLAN is an unencrypted LAN for access by passengers in the vehicle, a second VLAN is an encrypted LAN for personnel in the vehicle, and a third VLAN is an encrypted LAN for a network management. In this embodiment, for example, only one data network is necessary in order to implement three different "sub" networks that are able to be used separately from each other. In an embodiment of the present invention, in order to attain the highest possible failure safety, the data network and the wireless communications links between adjacent coupled units may be designed redundantly. In doing so, in a unit having radio access points, two radio access points are provided, each assigned to different segments of the data network, and each of the two segments in a unit has two wireless communications links between adjacent coupled units. For instance, should one radio access point in a unit fail, the data traffic is handled via the second radio access point. It may be that the data-transmission rates available for each user of the data network in this unit may then decline, however the data network does not completely fail in the unit affected. This also holds true for the wireless communications links between adjacent units which have a higher failure safety because of their redundant design.

In an embodiment of the present invention, two radio access points in several units of the vehicle are to be disposed in such a way that radio coverage sufficient for a stable communications link is ensured from any place in these units. For example, in a further embodiment of the present invention, the intention is for one of the two radio access points to be disposed at the beginning, and the other at the end of a unit of the vehicle. For most units, for example, in the case of high-speed trains, this arrangement has proven to be a good compromise between radio coverage and expenditure for the cabling of components of the system according to the present invention. In an embodiment of the present invention, for example, in order to avoid mutual influences, especially interferences, for example, the two radio access points should use different radio channels for communication with data-processing devices, for instance, in the case of WLAN equipment, channels far apart from each other in terms of frequency, such as channels 1 and 11.

In an embodiment of the present invention, in order, to the greatest extent possible, to avoid an influence in terms of frequency between the radio access points in the units and the wireless communications links between adjacent units, radio access points may in each case be operated in a frequency range of approximately 2.4 GHz, and wireless communications links between adjacent coupled units may in each case be operated in a frequency range of approximately 5 GHz.

In an embodiment of the present invention, to attain the highest possible stability of the wireless communications links, they are to be provided between adjacent coupled units, in each case at the beginning and end of each unit. The radio link of the wireless communications links is thereby short, and the received field strength at the respective stations of the wireless communications links is correspondingly high and therefore immune to interference.

In an embodiment of the present invention, the wireless communications links may be disposed in the area of connecting corridors between adjacent coupled units where they can be integrated without greater technical expenditure, for example, in the case of train cars. For example, according to an embodiment of the present invention, the wireless communications links may be disposed in the ceiling or door area at or of connecting corridors between adjacent coupled units.

An embodiment of the present invention provides for powering the radio access points and the wireless communications links between adjacent coupled units using a separate electric circuit. In this way, the data network is able to be switched off easily and quickly without substantially influencing other electrical components in the units of the vehicle. Further advantages and uses of the present invention are yielded from the following description of exemplary embodiments.

DETAILED DESCRIPTION

In the following, functionally identical elements may be provided with the same reference symbols.

Figure 1:
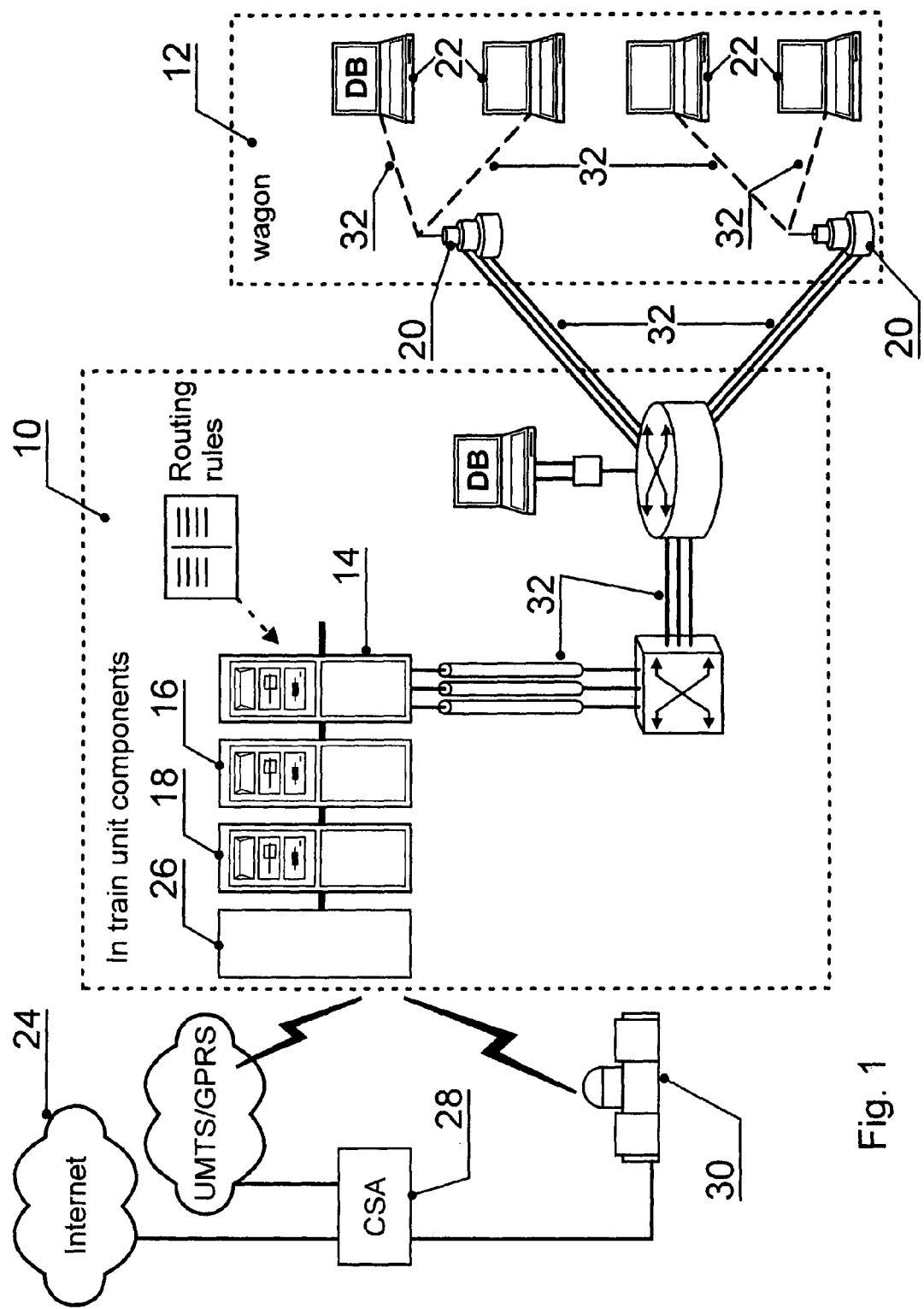
FIG. 1 shows an overall view of the entire system for accessing information and for communication in an ICE train having several cars, together with its individual components.

FIG. 1 shows the components and their communication links of a local access network and of a WLAN backbone as used in an ICE train of Deutsche Bahn AG. The local access network and the WLAN backbone form a data network according to the present invention for accessing information and for communication in the train. In particular, it is a transport platform which connects passenger data-processing devices or user terminals (e.g., laptop, Notebook, PDA, etc.) having WLAN capability to an access server in the train in order to allow passengers to access the Internet in the train. The components shown can be divided into group 10 of "in train unit" components and group 12 of components provided in the individual cars of the train.

The components of group 10 are central components of the system, and as a rule are located in a central car of the train. Group 10 has a central server unit which includes an access server 14, an application server 16 and a gateway server 18. The central server unit regulates the access to Internet 24 via an MAR (Mobile Access Router) 26 which switches the communications links of terminals 22 of passengers to Internet 24 via mobile radio links such as UMTS or GPRS (General Packet Radio Service). Located between Internet 24 and router 26 is a CSA (Central Service Area) 28, which is a mobile radio network of a mobile radio service provider via which the communications links to Internet 24 are produced. MAR 26 is also able to communicate with a corresponding remote terminal in a railroad station 30 via a WLAN radio link, e.g., in order to load up-to-date information onto application server 16 during a stopover of the train in railroad station 30.

Group 12 includes radio access points (WLAN access points) 20, via which data-processing devices or terminals 22, particularly laptops of passengers, are able to set up communications links to the central server unit. WLAN access points 20 are distributed in the individual cars of the train in such a way that optimal radio coverage of passengers can be attained.

Access to individual WLAN access points 20 (or antennas connected to them) distributed in the individual cars of the train is possible for a passenger everywhere in the train without a special software or configuration for terminals 22 (Notebooks, laptops, MDAs (Mobile Digital Assistants) and PDAS) being necessary, provided a terminal 22 has a WLAN radio module. The connection of terminals 22 of the passengers or of the train personnel is accomplished via the WLAN Standard IEEE 802.11b in the 2.4 GHz frequency band.

Data network 32 formed in the train includes three VLANs, which are provided for various purposes (see description further below).

For network access by train personnel, special security requirements are fulfilled in the separate VLAN in order to prevent access by unauthorized persons. At least the following security settings can be set up:

No broadcast of the SSID (Service Set Identifier; closed network);

WLAN encryption, at least WPA-TKIP, better WPA2 with AES encryption according to 802.11i.

In an embodiment of the present invention, the encryption settings must be supported by the terminals of the train personnel.

In the following, the WLAN backbone in the train is described in detail. In an exemplary embodiment, since there is no possibility of using cable connections between the individual cars of the train, the coupling or communication between the train cars must be accomplished using non-contact techniques. Here, WLAN radio components offer the advantage of simple and cost-effective implementation with bridging functionality. In order to provide a frequency-wise decoupling with respect to passenger access, the utilization of the WLAN Standard IEEE 802.11a/h in the 5 GHz range may be used for the WLAN backbone. The Standard IEEE 802.11b/g may also be used. In this case, by a suitable frequency assignment in the case of APs and bridges, it can be ensured that occurring interferences are minimized.

For example, if IEEE 802.11b is used, the backbone capacity is approximately 6 Mbps (approximately 1.5 Mbps per car), which means that from each car:

up to 20 passengers are able to access the Internet or local content in the train with ISDN speed (with approximately 70 kbps per user) or up to 5 passengers are able to use streaming media content (with approximately 300 kbps per user).

For example, if IEEE 802.11g or 802.11a is used, the backbone capacity is approximately 24 Mbps (approximately 6 Mbps per car), which means that from each car:

up to 85 passengers are able to access the Internet or local content in the train with ISDN (Integrated Services Digital Network) speed (with approximately 70 kbps per user) or up to 20 passengers are able to use streaming media content (with approximately 300 kbps per user).

A possible network traffic control is performed by access server 14, which is used as the central routing entity.

In an exemplary embodiment of the present invention, the data network in the train is initialized as follows: The IP (Internet Protocol) communications infrastructure is automatically booted and configured independently after the assembly of the train and the "train launching" then following, after a power failure or after the return from out of the country. The IP addresses are assigned via a DHCP (Dynamic Host Configuration Protocol) server in access server 14. In the course of this process, the individual components are to be configured automatically via the management system of the train. The transition from the LAN to the WAN (Wide Area Network), especially Internet 24, is formed by access server 14. It is used as the routing instance between the VLANs and in the direction of the WAN. A sufficient supply of private IP addresses from a private IP address space is made available per train. These IP addresses are transmitted up to CSA 28 of an Internet service provider. The IP address distribution for the passenger coverage and for the individual network components is accomplished via DHCP. An assignment of IP addresses for the individual network components is only necessary for management purposes. In this connection, however, it must be ensured that no unauthorized users or train components on the adjacent track are integrated into the infrastructure.

A local network may be formed in the train for the local information supply. To that end, the server unit, made up of access server 14, gateway server 18 and application server 16 as components, is used within a train as the central instance of the train network. This server unit (onboard unit) is accommodated completely in the center car of the train. The routing functionality (layer 3) for the train data network is located in access server 14. The local train data network outside of access server 14 is made up of:

WLAN access points 20 or antennas,

WLAN bridges (see FIG. 2, reference numerals 114 and 116) or antennas.

Communication to the world outside of the train takes place via access server and gateway server 14 and 18, respectively (e.g., with the aid of mobile radio and/or wireless LAN/MAN technologies). The passengers in the individual cars, via WLAN access points 20 and via access server and gateway server 14 and 18 (external), respectively, access Internet 24 (the latter via CSA 28).

Upon crossing into foreign countries, all active components of the data network in the train can be switched off. WLAN access points 20 or WLAN bridges and MAR 26 are carried on a dedicated electric circuit which is switched off, controlled by the GPS (Global Positioning System), upon leaving a predetermined region, e.g., upon crossing the national border. After the return to the predetermined region, the electric circuit is switched on again automatically and the components of the WLAN network boot independently and are functional again after a brief time.

In an embodiment, basic conditions for the setup of the data network in the train are:

the possibility of installing hardware components (antennas, WLAN access points, WLAN bridges, switches, and others) at suitable locations in the respective train cars;

a power supply for the components at the installation locations, as well as suitable installation paths for cabling the components between each other. A sufficient capacity of the power supply must be ensured.

The installation locations of the antennas (in conjunction with the WLAN access points) should be situated in such a way that sufficient radio coverage of the car interior is attainable with the aid of WLAN.

In an exemplary embodiment, as already mentioned above, at least 3 VLANs are implemented in the data network in the interior of the train, of which one is provided for the access of passengers (unencrypted),
one is provided for the train personnel (encrypted, Walled Garden) and
one is provided for the network management (encrypted).

The VLAN for the network management should not be routed via the WLAN interface.

The IPv4 protocol is used in the data network. The SNMP Standards (Simple Network Management Protocol) Version 1 are supported for the use of a uniform network management. The use of SNMP Version 3 is to be recommended from the standpoint of security. The network equipment should be able to implement SNMP traps and to transmit SNMP messages.

In embodiments of the present invention, in order to avoid invasions such as data leakage among the passengers, the hardware components should make functions available which forbid passenger traffic taking place among one another (PSPF: Public Secure Packet Forwarding).

In order to simplify maintenance, configuration updates, as well as operating-system updates and applications updates should be able to be distributed remotely to the network elements and activated. The individual network elements should not be addressable via the WLAN-APs of the customer interface.

Figure 2:
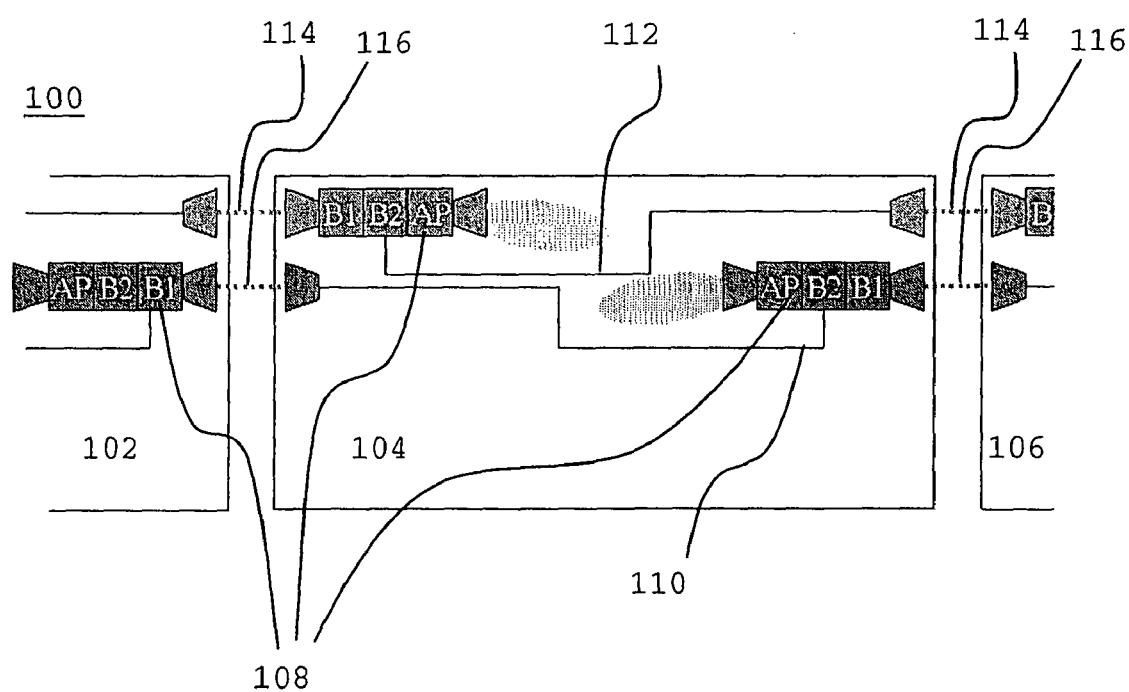
FIG. 2 shows the arrangement of radio access points and routers in cars of an ICE train according to an exemplary embodiment of the system according to the present invention.

In the following, a technical solution for implementing the system of the present invention with a redundant data network concept in a train 100 having several cars 102, 104 and 106 coupled together is provided. FIG. 2 shows the simplified block diagram of the technical solution, using coupled cars 102, 104 and 106 of train 100 as an example. This design approach is specified based on the use of a device 108 that includes both an access-point functionality and the WLAN bridge functionality, and is equipped with 3 radio modules. Of these 3 radio modules, two modules function as WLAN bridges B1 and B2, and one module functions as access point AP.

The data network formed includes two Ethernet segments 110 and 112. The two segments 110 and 112 are run in parallel through the entire train. The network in the train is therefore split into two broadcast domains. By the utilization of two devices 108 in car 104, it is possible both to (redundantly) illuminate or identify the passenger compartment with two access points AP, and to redundantly lay out WLAN bridges B1 and B2 between cars 104 and 102 or 106. Two switched networks are set up per train. The servicing of the passenger compartments is carried out in the 2.4 GHz range; each car is equipped with two APs. Three overlap-free radio channels are available here, so that a quasi interference-free radio coverage can be ensured within the individual cars. The 5 GHz range is used for WLAN bridge connections 114 and 116 (WLAN backbone between cars 102, 104 and 106), so that a complete decoupling of the WLAN access networks in the passenger compartments and the WLAN backbone between the individual cars is achieved.

Further special features of this design approach are that
two IP sub-networks are formed, which are run in parallel through the train,
the local routing instance in the train is access server 14,
in the event of the failure of one WLAN bridge antenna or one WLAN bridge, the corresponding (functioning) system in the adjacent car is able to switch itself to the redundant WLAN bridge still functioning, and
devices 108 are able to read out prioritization information from the TOS field of the IP packet and to convert it according to the rules.

To achieve optimal decoupling between the access network and the WLAN backbone, the bridges should be realized in the Standard IEEE802.11a/h (frequency in the 5 GHz range). The antennas for the WLAN backbone are preferably placed near the respective connecting corridors between cars. Devices 108 are laid out in such a way that, in general, two APs are provided in the car. Two (redundant) WLAN bridge connections 114 and 116 are set up per connecting corridor between cars.

The components are managed via a network management station (patrol agent) in the train. The management tasks in the train are implemented via this network management station.

External connections are accessed via gateway server 18. As a rule, the train-land interface is connected only indirectly via access server 14 to the local IP/WLAN infrastructure.

An embodiment of the present invention provides for a vehicle having a plurality of coupled units such as a train, a system is provided for accessing information and for communication by passengers which can be implemented inexpensively, e.g., using standard network components, and can be laid out redundantly for high failure safety.

What is claimed is:

1. A system for accessing information and for communication in a high-speed vehicle having a plurality of coupled units, comprising:
    at least one server unit that is provided in one unit of the vehicle and is set up for making information available and for communication;
    a plurality of radio access points which are provided in different units and are designed for data communication with data-processing devices via radio;
    a data network which connects the server unit to the radio access points in terms of communication and which has wireless communications links between adjacent coupled units,
    wherein it is set up in such a way that the radio access points and the wireless communications links between adjacent coupled units are one of activated and deactivated as a function of the geographical position of the vehicle, including that the radio access points and the wireless communications links between adjacent coupled units are deactivated when the vehicle leaves a predetermined region, and are activated again when the vehicle reenters the predetermined region.

2. The system as recited in claim 1, wherein the server unit also includes an application server which is provided for local information and application provisioning in the vehicle.

3. The system as recited in claim 1, wherein the data network is a Local Area Network—LAN—in which at least three virtual LANs—VLANs—are implemented, of which a first VLAN is an unencrypted LAN for access by passengers in the vehicle, a second VLAN is an encrypted LAN for personnel in the vehicle, and a third VLAN is an encrypted LAN for a network management.

4. The system as recited in claim 1, wherein the data network and the wireless communications links between adjacent coupled units are laid out redundantly; in doing so, in a unit having radio access points, two radio access points are provided, each assigned to different segments of the data network, and each of the two segments in a unit has two wireless communications links between adjacent coupled units.

5. The system as recited in claim 1, wherein two radio access points are disposed in several units of the vehicle in such a way that radio coverage sufficient for a stable communications link is ensured from any place in these units.

6. The system as recited in claim 5, wherein one of the two radio access points is disposed at the beginning, and the other at the end of a unit of the vehicle.

7. The system as recited in claim 5, wherein the two radio access points use different radio channels for communication with data-processing devices.

8. The system as recited in claim 5, wherein radio access points are each operated in a frequency range of approximately 2.4 GHz, and wireless communications links between adjacent coupled units are each operated in a frequency range of approximately 5 GHz.

9. The system as recited in claim 8, wherein in each case the wireless communications links between adjacent coupled units are provided at the beginning and end of each unit.

10. The system as recited in claim 9, wherein the wireless communications links are disposed in the area of connecting corridors between adjacent coupled units.

11. The system as recited in claim 9, wherein the wireless communications links are disposed in the ceiling or door area at or of connecting corridors between adjacent coupled units.

12. The system as recited in claim 8, wherein the radio access points and the wireless communications links between adjacent coupled units are powered by a separate electric circuit.

13. The system as recited in claim 1, wherein a wireless communications link is implemented between two adjacent coupled units of the vehicle by way of a radio bridge.

14. The system as recited in claim 1, wherein the radio bridge is designed for radio communication in a frequency range that differs from the frequency range used for a radio communication within the units, such that occurring interferences are minimized.

15. The system as recited in claim 1, wherein the server unit includes an access server and gateway server which are set up for controlling the entire communication via the data network and for radio communication with the Internet.

16. The system as recited in claim 1, wherein the access server and gateway server are set up in such a way that a radio communication with the Internet is accomplished using a mobile-radio and/or wireless LAN/MAN technology.

* * * * *